(12) United States Patent
Chen et al.

(10) Patent No.: US 11,543,858 B2
(45) Date of Patent: Jan. 3, 2023

(54) PORTABLE ELECTRONIC APPARATUS WITH MULTIPLE SCREENS

(71) Applicant: Acer Incorporated, New Taipei (TW)

(72) Inventors: Hung-Chi Chen, New Taipei (TW); Shun-Bin Chen, New Taipei (TW); Huei-Ting Chuang, New Taipei (TW); Pao-Ching Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/357,898

(22) Filed: Jun. 24, 2021

(65) Prior Publication Data
US 2022/0129038 A1 Apr. 28, 2022

(30) Foreign Application Priority Data
Oct. 22, 2020 (TW) ................................. 109136631

(51) Int. Cl.
*G06F 1/16* (2006.01)

(52) U.S. Cl.
CPC .......... *G06F 1/1641* (2013.01); *G06F 1/1601* (2013.01); *G06F 1/1649* (2013.01); *G06F 1/1679* (2013.01)

(58) Field of Classification Search
CPC .... G06F 1/1641; G06F 1/1601; G06F 1/1649; G06F 1/1679
See application file for complete search history.

(56) References Cited

U.S. PATENT DOCUMENTS

| | | | |
|---|---|---|---|
| 8,243,471 B2 * | 8/2012 | Liang | G06F 1/1603 361/810 |
| 9,441,782 B2 * | 9/2016 | Funk | F16M 13/00 |
| 10,082,832 B1 * | 9/2018 | Wang | G06F 1/1681 |
| 10,168,739 B1 * | 1/2019 | Chen | G06F 1/1616 |
| 10,613,585 B2 * | 4/2020 | Park | G09G 3/003 |
| 10,817,020 B1 * | 10/2020 | DeMaio | G06F 3/1423 |
| 10,976,779 B1 * | 4/2021 | Tsai | G06F 1/1615 |
| 11,086,364 B2 * | 8/2021 | Yamazaki | G06F 1/1654 |
| 2008/0134550 A1 * | 6/2008 | Sun | G06F 1/1601 361/600 |
| 2010/0124006 A1 * | 5/2010 | Chang | G06F 1/1624 361/679.04 |
| 2020/0278722 A1 * | 9/2020 | Hudgins | H05K 5/0247 |
| 2021/0365067 A1 * | 11/2021 | Liu | G06F 1/1649 |

* cited by examiner

*Primary Examiner* — Rockshana D Chowdhury
(74) *Attorney, Agent, or Firm* — JCIPRNET

(57) ABSTRACT

A portable electronic apparatus with multiple screens includes a first screen and a second screen movably coupled to the first screen along an arcuate path to be received in the first screen or moved out of the first screen. The first screen and the second screen face a same side of the portable electronic apparatus. The second screen includes a base, a lifting mechanism disposed on the base, and a display unit. The display unit is disposed on the lifting mechanism to be driven by the lifting mechanism to be lifted or lowered relative to the base. When the second screen is moved out of the first screen and a step is provided between a display surface of the display unit and a display surface of the first screen, the display unit is adapted to be lifted relative to the base through the lifting mechanism to compensate the step.

11 Claims, 9 Drawing Sheets

PORTABLE ELECTRONIC APPARATUS WITH MULTIPLE SCREENS

CROSS-REFERENCE TO RELATED APPLICATION

This application claims the priority benefit of Taiwan application serial no. 109136631, filed on Oct. 22, 2020. The entirety of the above-mentioned patent application is hereby incorporated by reference herein and made a part of this specification.

BACKGROUND

Technical Field

The disclosure relates to a portable electronic apparatus, and in particular, to a portable electronic apparatus with multiple screens.

Description of Related Art

Portable electronic apparatuses, such as pocket personal computers, handheld computers, notebook computers, personal tablet computers, and personal digital assistants (PDAs) become more and more common. In order to provide users with more diversified operation and viewing modes, portable electronic apparatuses with multiple screens are provided. At present, in most of the portable electronic apparatuses with multiple screens, linkage structures are adopted for pivotally connection, so that any two screens are suitable for relative rotation, and an unfolding angle may be maintained.

Nevertheless, through the linkage structure, an obvious step is provided between the main screen and the secondary screen in a portable electronic apparatus with multiple screens. A poor visual effect is thereby provided, and the appearance of the product may not be as satisfactory as expected. Further, the linkage structure connecting multiple screens is complex and thus may not be operated easily. As such, the user may not enjoy a favorable using experience when using the portable electronic apparatus with multiple screens.

Accordingly, how to eliminate the step between the main screen and the secondary screen in a portable electronic apparatus with multiple screens to improve overall appearance and provide good operation flexibility and a favorable using experience is an important issue.

SUMMARY

The disclosure provides a portable electronic apparatus with multiple screens in which a step provided when a second screen is moved out of the first screen is compensated through a lifting mechanism, and that good operation flexibility and a favorable overall appearance are provided.

A portable electronic apparatus with multiple screens provided by the disclosure includes a first screen and a second screen. The second screen is movably coupled to the first screen along an arcuate path to be received in the first screen or moved out of the first screen. A display surface of the first screen and a display surface of the second screen face a same direction. The second screen includes a base, a lifting mechanism, and a display unit. The lifting mechanism is disposed on the base. The display unit is disposed on the lifting mechanism to be driven by the lifting mechanism to be lifted or lowered relative to the base. When the second screen is moved out of the first screen and a step is provided between a display surface of the display unit and the display surface of the first screen, the display unit is adapted to be lifted relative to the base through the lifting mechanism to compensate the step.

To sum up, in the portable electronic apparatus with multiple screens provided by the disclosure, the second screen is movably coupled to the first screen to be received in the first screen or to be moved out of the first screen. Moreover, the second screen may be lifted or lowered through the lifting mechanism and drives the display unit on the lifting mechanism to be lifted or lowered relative to the base. Accordingly, when the second screen is moved out of the first screen and a step is provided between the display surface of the display unit and the display surface of the first screen, the display unit is adapted to be lifted relative to the base through the lifting mechanism to compensate the step. In this way, the portable electronic apparatus with multiple screens may exhibit good operation flexibility and provides an appealing overall appearance, and a user may therefor enjoy a favorable visual effect when operating the portable electronic apparatus with multiple screens.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
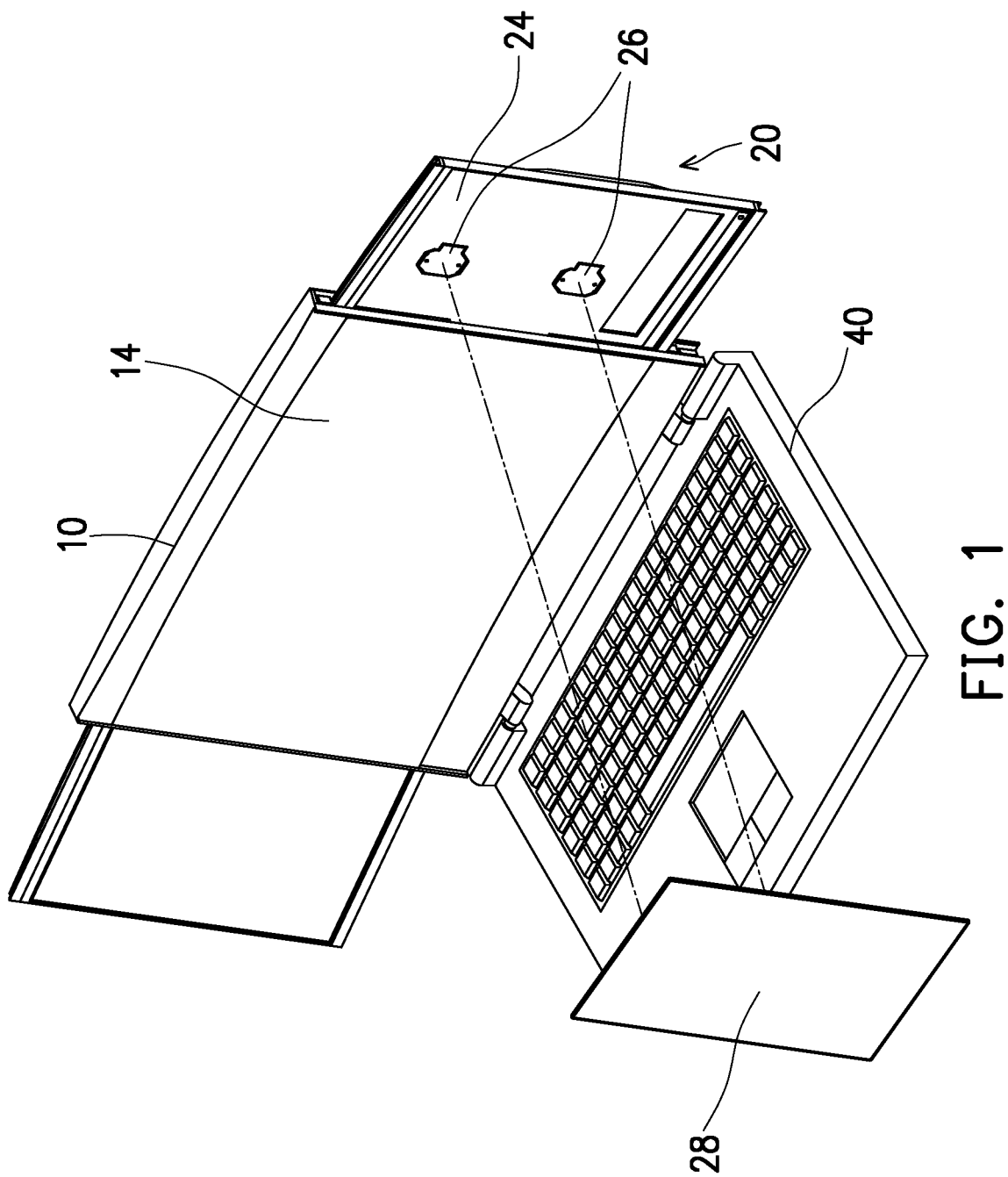
FIG. 1 is a schematic view of a portable electronic apparatus in a first state according to an embodiment of the disclosure.
Figure 2A:
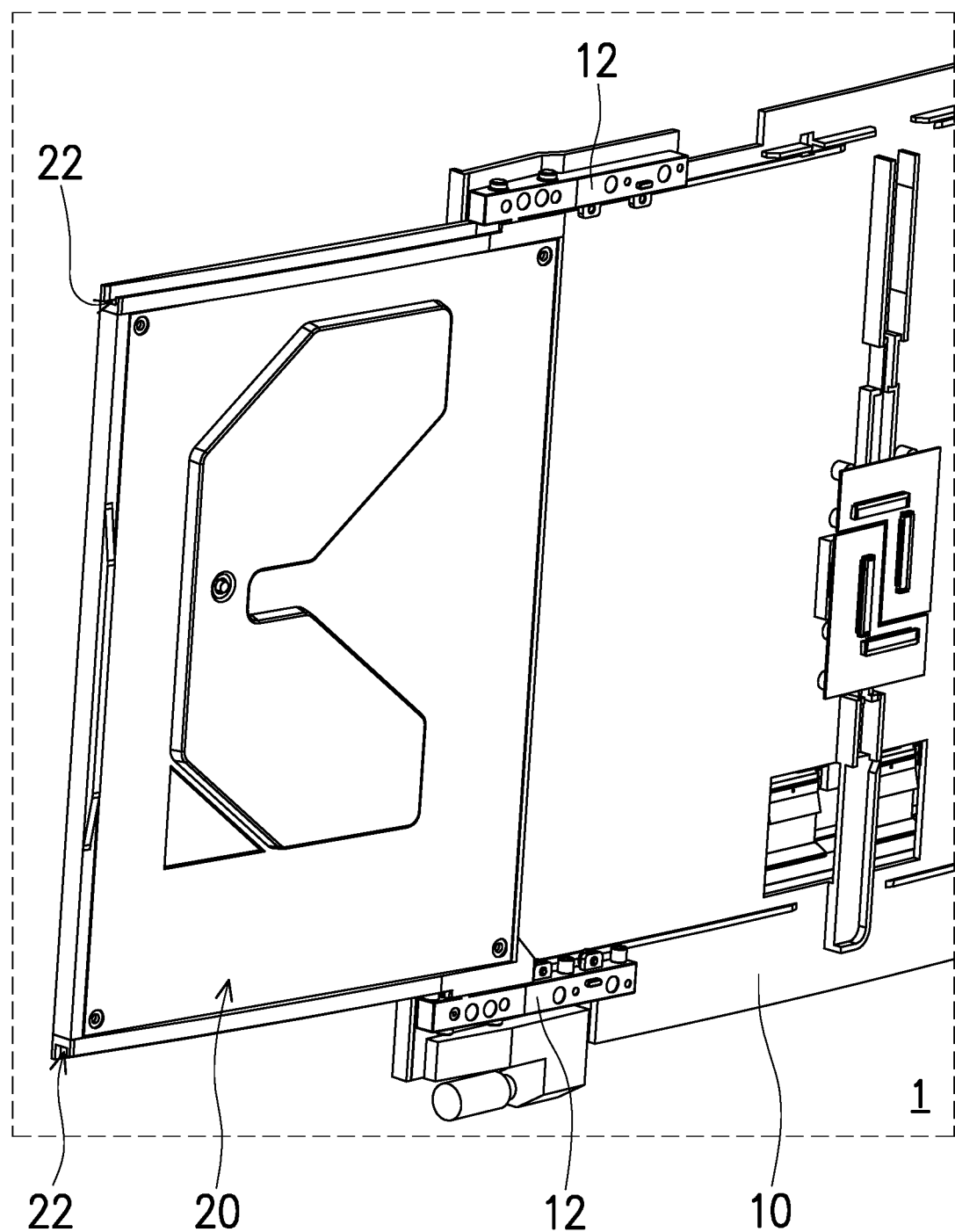
FIG. 2A is a schematic view of some members of the portable electronic apparatus of FIG. 1 from another viewing angle.
Figure 2B:
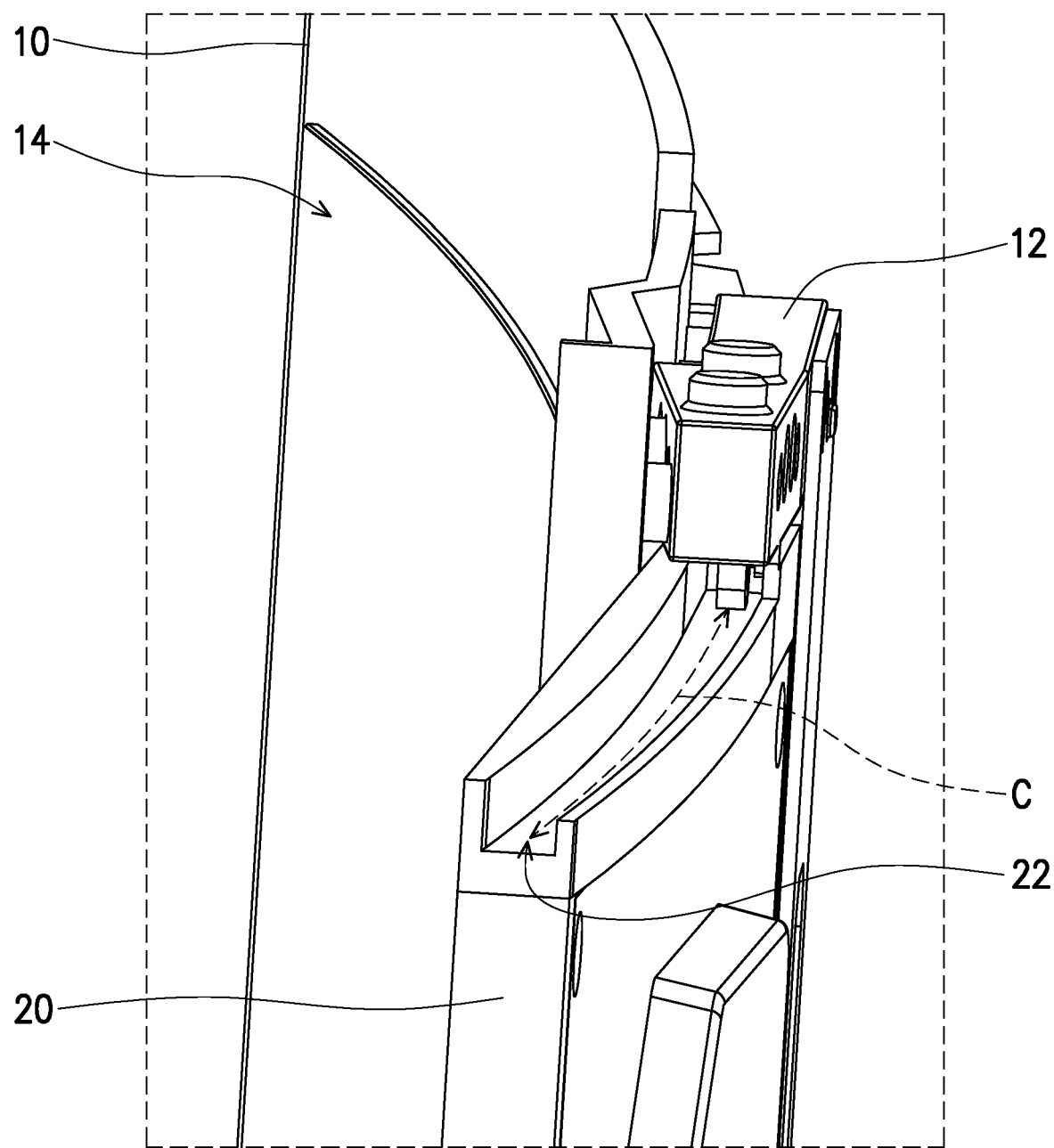
FIG. 2B is a local enlargement view of FIG. 2A from another viewing angle.
Figure 3:
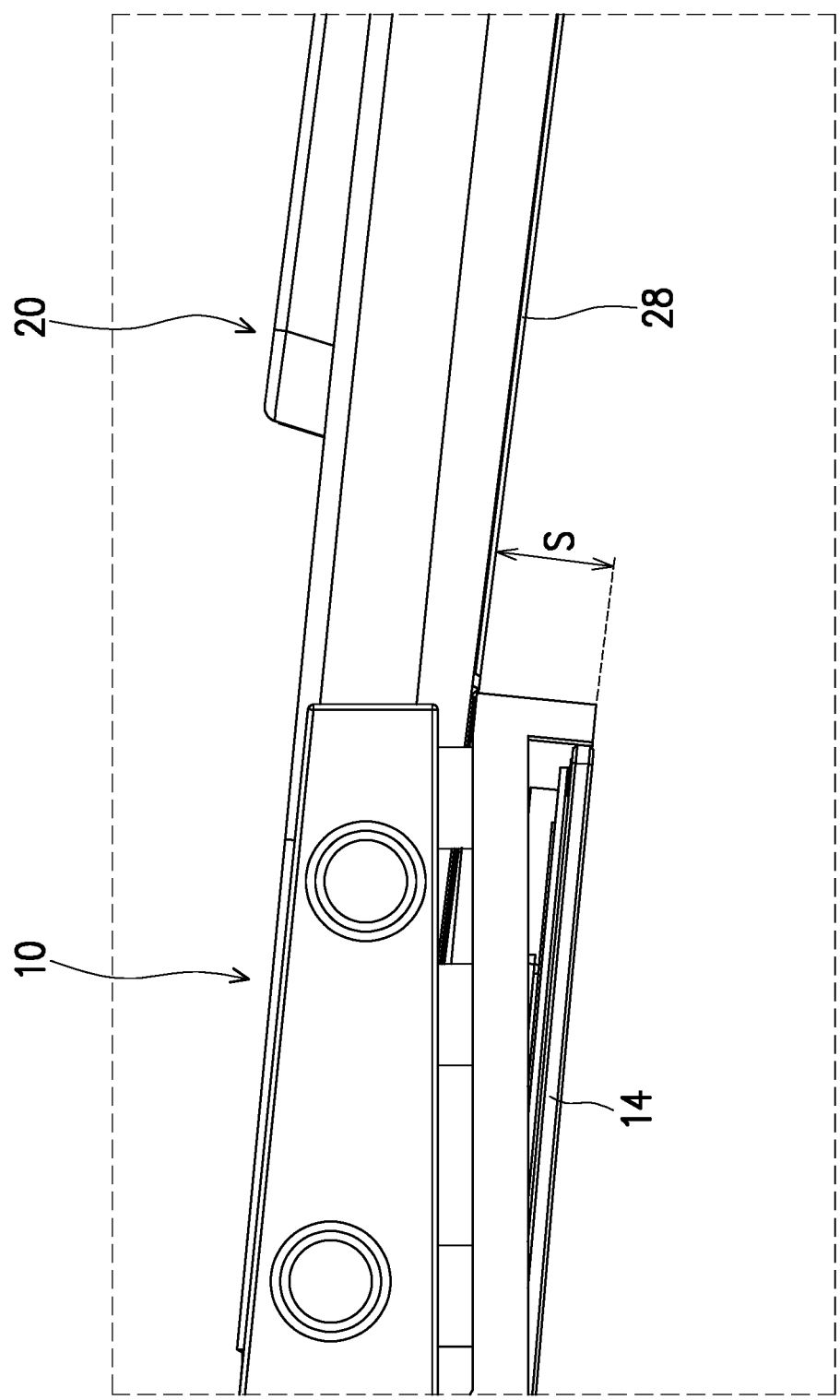
FIG. 3 is a local enlargement top view of the portable electronic apparatus of FIG. 1.

FIG. 1 is a schematic view of a portable electronic apparatus in a first state according to an embodiment of the disclosure, and some members are shown in an exploded view. FIG. 2A is a schematic view of some members of the portable electronic apparatus of FIG. 1 from another viewing angle. FIG. 2B is a local enlargement view of FIG. 2A from another viewing angle. FIG. 3 is a local enlargement top view of the portable electronic apparatus of FIG. 1. With reference to FIG. 1 to FIG. 3, in this embodiment, a portable electronic apparatus 1 with multiple screens is, for example, a notebook computer and includes a host 40 and a plurality of screens pivotally connected to the host 40. In the present embodiment, these screens include a first screen 10 (main screen) and a pair of second screens 20 (secondary screens). Herein, the second screens 20 are located at two opposite sides of the first screen 10, a display surface of the first screen 10 and display surfaces of the second screens 20 face a same direction, and the second screens 20 may be movably coupled to the first screen 10 to be received in the first screen 10 or moved out of the first screen 10, so that a user may adjust an entire size of the screens according to needs. A number of the second screens 20 is not limited herein, and in another embodiment that is not shown, only a single second screen may used to be assembled to the first screen.

To be specific, as shown in FIG. 2A and FIG. 2B, the first screen 10 has two guiding members 12, and side edges of the second screens 20 has two arcuate tracks 22. The guiding members 12 are disposed relative to the arcuate tracks 22 of the second screens 20. In this way, the guiding members 12 may move along arcuate paths C to be coupled to the arcuate tracks 22, so that the second screens 20 may be received in the first screen 10 or may be moved out of the first screen 10.

Further, as shown in FIG. 1, relationships between structures of this pair of second screens 20 and the corresponding first screen 10 are consistent. Therefore, only one side of the second screens 20 is described in this embodiment. The second screen 20 includes a base 24, two lifting mechanisms 26, and a display unit 28. The lifting mechanisms 26 are disposed on the base 24, and the display unit 28 is disposed on the lifting mechanisms 26 to be driven by the lifting mechanisms 26 to be lifted or lowered relative to the base 24.

Figure 4:
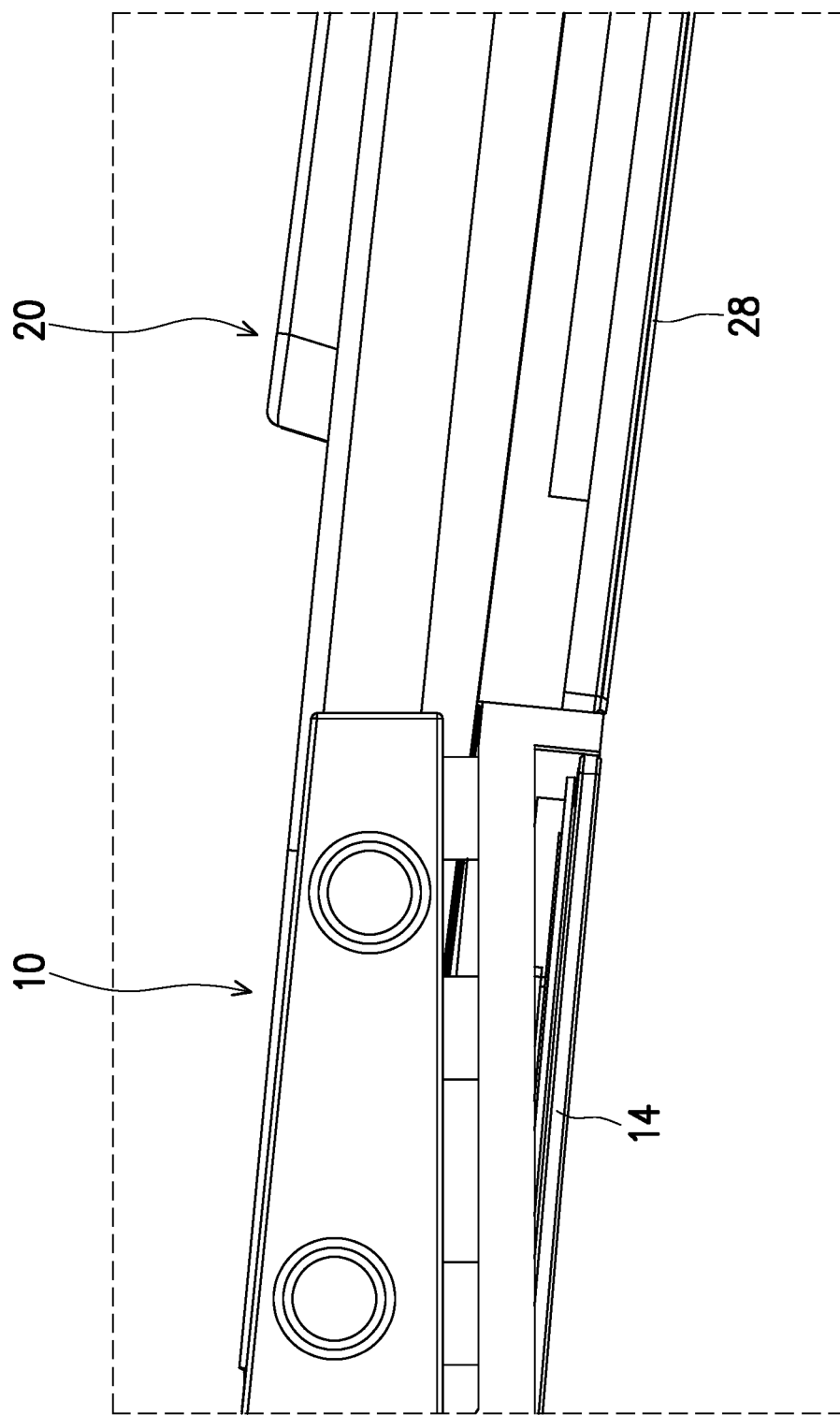
FIG. 4 is a local enlargement top view of the portable electronic apparatus of FIG. 1 in a second state.

FIG. 4 is a local enlargement top view of the portable electronic apparatus of FIG. 1 in a second state. The first state and the second state of the portable electronic apparatus 1 are described below.

With reference to FIG. 1, FIG. 3, and FIG. 4 together, in this embodiment, when the second screen 20 is just moved out of the first screen 10 as in the first state, a step S is provided between a display surface of the display unit 28 and a display surface of a display unit 14 of the first screen 10, as shown in FIG. 3. Next, the user may drive the display unit 28 located on the lifting mechanisms 26 to be lifted relative to the base 24 through the lifting mechanisms 26 to compensate the step S, so that the portable electronic apparatus 1 is transferred from the first state to the second state, as shown in FIG. 4.

Further, the first screen 10 provided in this embodiment is a curved screen, and the second screen 20 is a flat screen. As such, in the second state when the second screen 20 is moved out of the first screen 10 and is driven by the lifting mechanisms 26 to be lifted relative to the base 24 (FIG. 4 and FIG. 5), an edge of the display surface of the display unit 14 may be aligned with an edge of the display surface of the display unit 28. In this way, the step S is eliminated through alignment of the display surface of the display unit 28 and the display surface of the display unit 14, and at the same time, the first screen 10 and the second screen 20 are combined as a whole. As such, an appealing appearance is provided, and the user may enjoy a three-dimensional broad visual experience.

Figure 5:
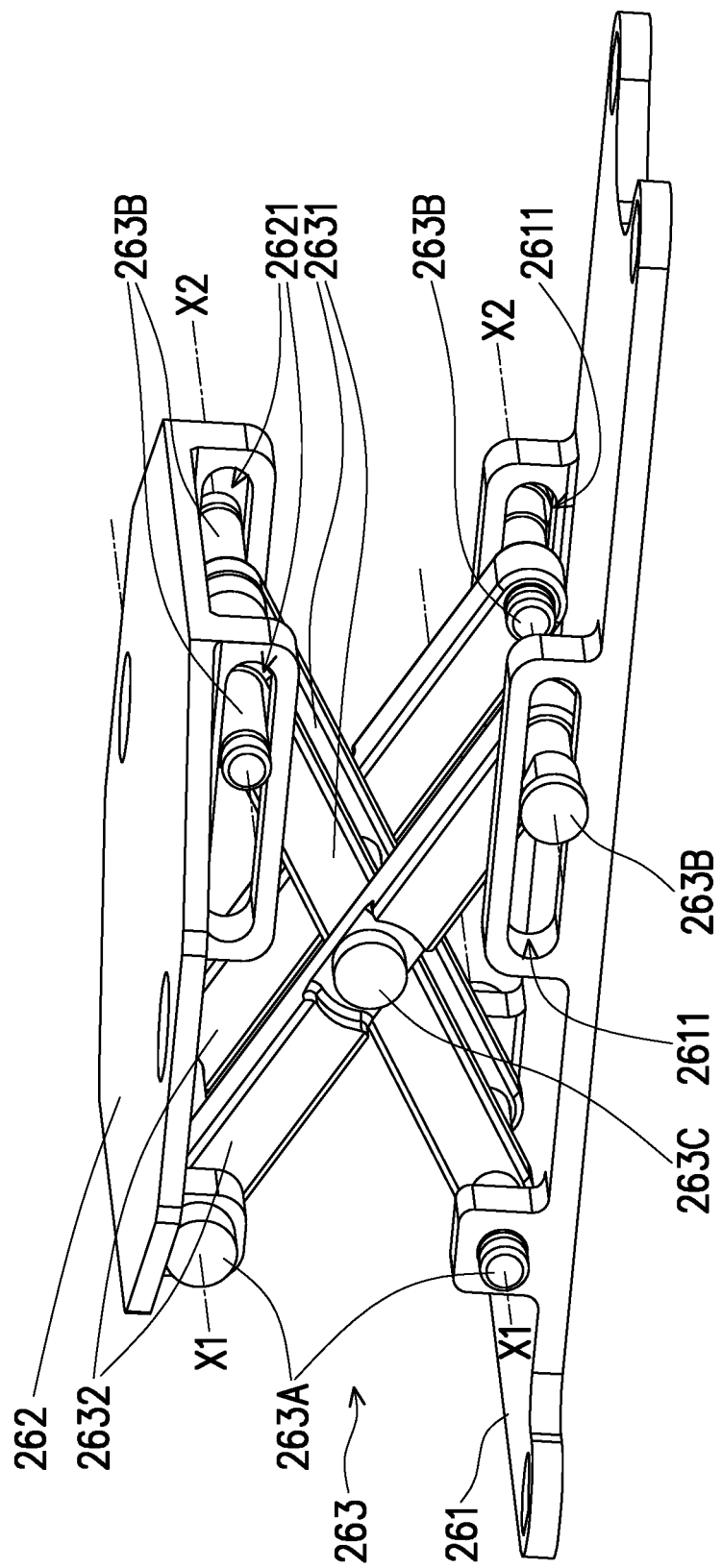
FIG. 5 is a three-dimensional schematic view of a lifting mechanism of FIG. 1.
Figure 6:
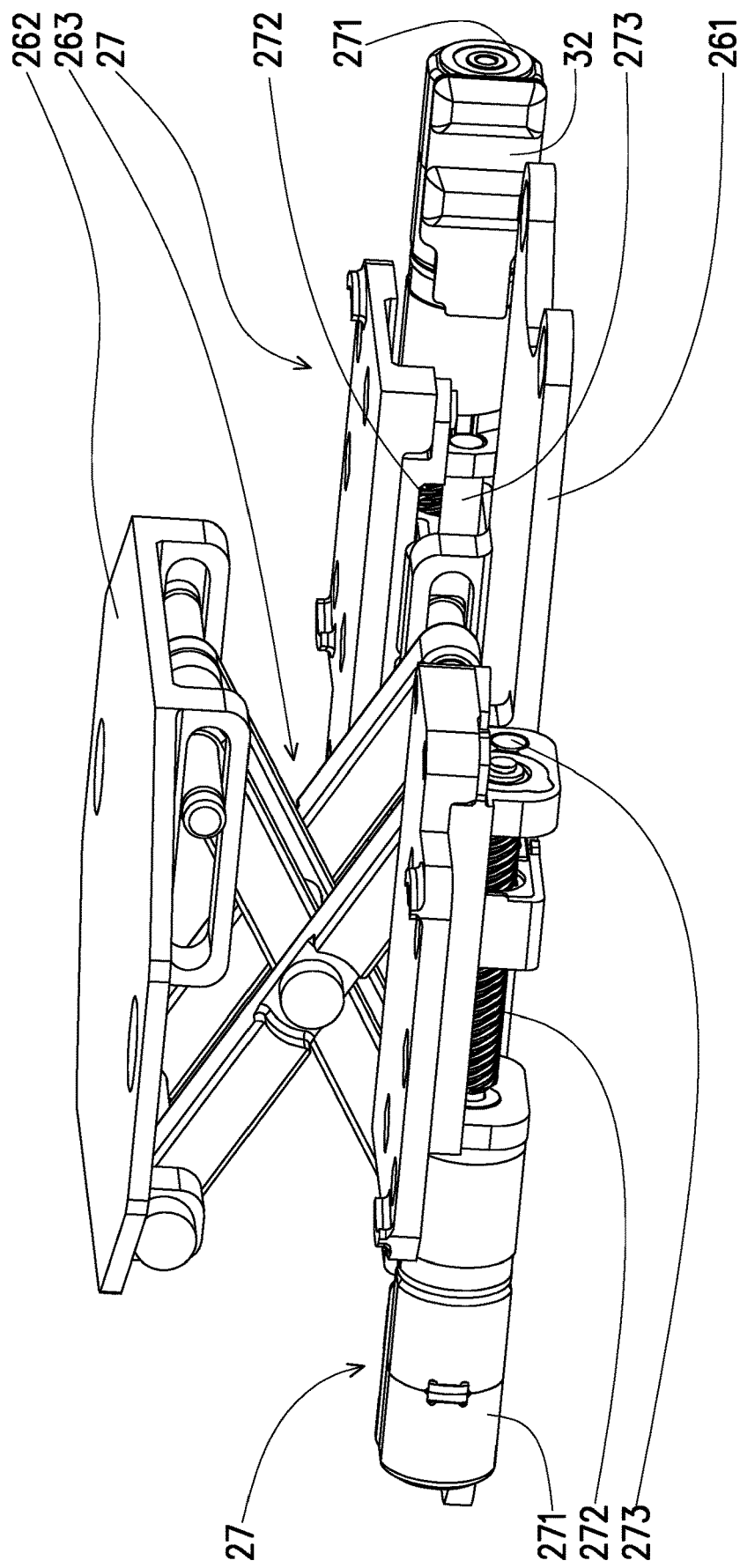
FIG. 6 is a three-dimensional schematic view of the lifting mechanism of FIG. 5 combined with a power assembly.
Figure 7:
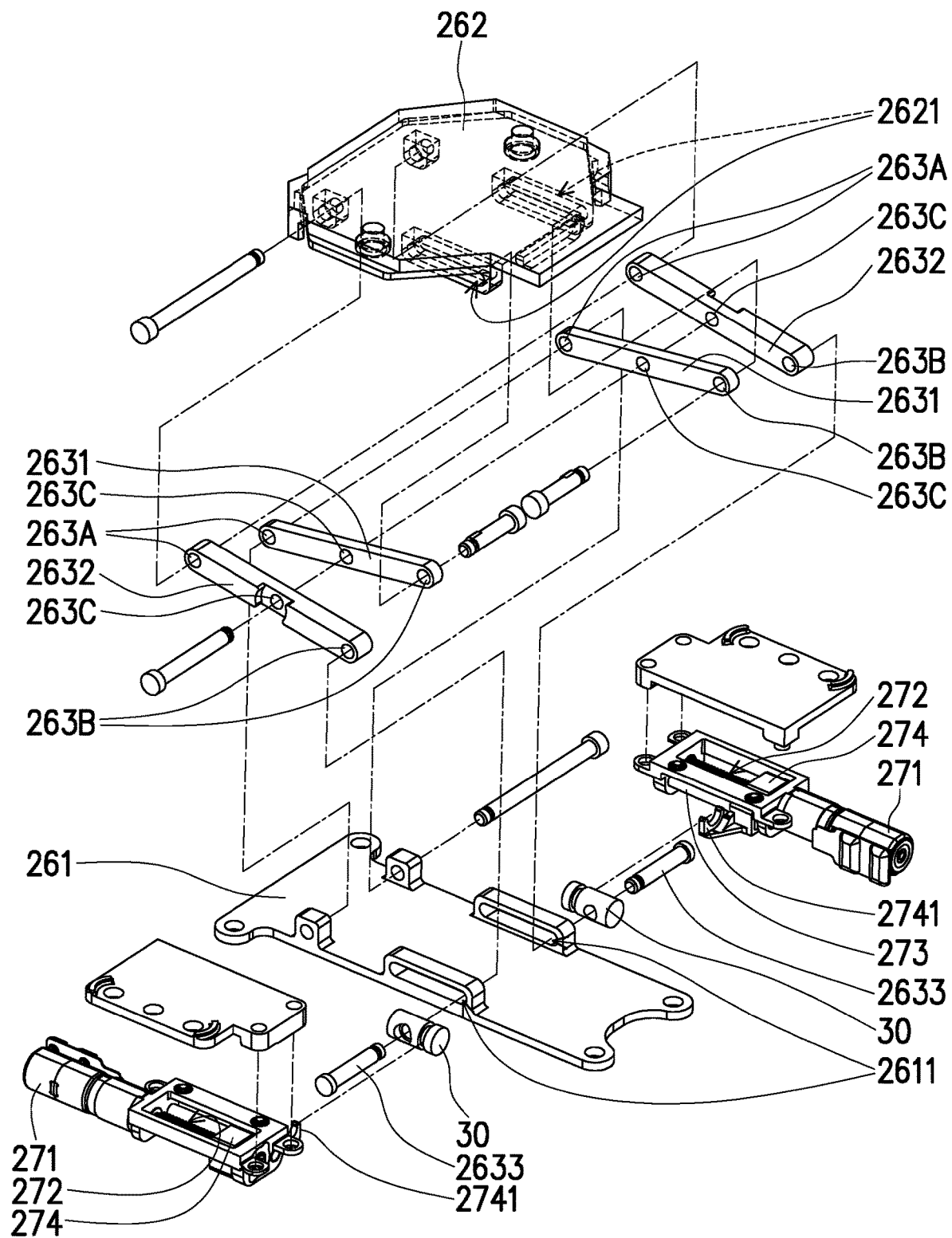
FIG. 7 is an exploded schematic view of the lifting mechanism and the power assembly of FIG. 6.

FIG. 5 is a three-dimensional schematic view of a lifting mechanism of FIG. 1. FIG. 6 is a three-dimensional schematic view of the lifting mechanism of FIG. 5 combined with a power assembly. FIG. 7 is an exploded schematic view of the lifting mechanism and the power assembly of FIG. 6. With reference to FIG. 5 to FIG. 7 together, in this embodiment, the lifting mechanism 26 includes a bottom plate 261, a carrier platform 262, and a scissor linkage group 263. The bottom plate 261 is disposed on the base 24 and has a pair of first sliding slots 2611. The carrier platform 262 has a pair of second sliding slots 2621, and the display unit 28 is disposed on the carrier platform 262. The scissor linkage group 263 has a plurality of pivotal connection ends 263A and a plurality of sliding ends 263B. The pivotal connection end 263A are pivotally connected to the bottom plate 261 and the carrier platform 262, and the sliding ends 263B individually pivot and are slidably coupled to the first sliding slots 2611 and the second sliding slots 2621.

To be specific, in this embodiment, the scissor linkage group 263 includes a pair of first linkages 2631 and a pair of second linkages 2632. Herein, each of the first linkages 2631 and the second linkages 2632 has the pivotal connection end 263A and the sliding end 263B. The first linkages 2631 and the second linkages 2632 are pivotally connected to each other at specific locations (pivotal connection holes 263C), and the pivotal connection holes 263C are located between the pivotal connection ends 263A and the sliding ends 263B.

Further, in this embodiment, the first sliding slots 2611 are disposed at two opposite sides of the bottom plate 261 in pair, and the second sliding slots 2621 are disposed at two opposite sides of the carrier platform 262 in pair. Moreover, the first sliding slots 2611 and the second sliding slots 2621 correspond to each other, so that the sliding ends 263B of the scissor linkage group 263 may synchronously move in a same direction. Further, pivoting axes X1 of the pivotal connection ends 263A are parallel to pivoting axes X2 of the sliding ends 263B, and moving paths of the sliding ends 263B are parallel to each other. In this way, the carrier platform 262 may be lifted or lowered relative to the bottom plate 261 in parallel.

Figure 8:
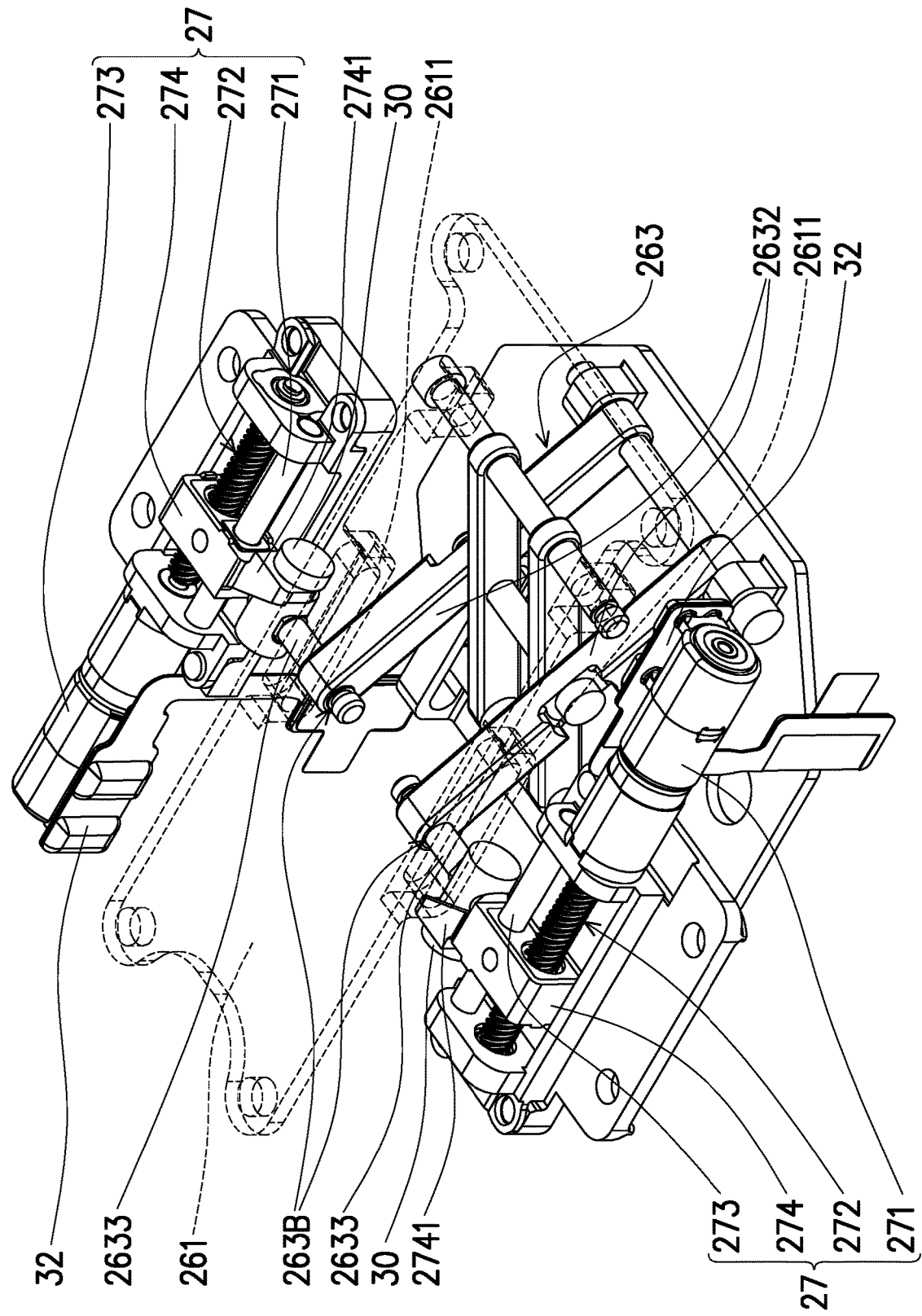
FIG. 8 illustrates the lifting mechanism and the power assembly of FIG. 6 from another viewing angle.

FIG. 8 illustrates the lifting mechanism and the power assembly of FIG. 6 from another viewing angle. Note that the bottom plate 261 of the lifting mechanism 26 is depicted in dotted lines in FIG. 8 to facilitate description of the lifting mechanism 26 and a power assembly 27.

With reference to FIG. 6 to FIG. 8 together, in this embodiment, the portable electronic apparatus 1 further includes two power assemblies 27, and the scissor linkage group 263 is located between the two power assemblies 27. The two power assemblies 27 are connected to the two sliding ends 263B of the scissor linkage group 263, and the scissor linkage group 263 and the power assemblies 27 are located at two opposite sides of the first sliding slot 2611 of the bottom plate 261.

To be specific, in this embodiment, each power assembly 27 includes a motor 271, a screw shaft 272, a guiding shaft 273, and a sliding block 274. The motor 271 and the guiding shaft 273 are disposed on the base 24, and the screw shaft 272 is connected to the motor 271. The sliding block 274 is screwed to the screw shaft 272 and is slidably connected to the guiding shaft 273, and the sliding block 274 is connected to the sliding end 263B of the scissor linkage group 263.

To be specific, in this embodiment, the motor 271 may drive the sliding block 274 through the screw shaft 272 and synchronously drives the sliding ends 263B to move along the first sliding slot 2611 and the second sliding slot 2621. Further, moving paths of the screw shaft 272, the guiding shaft 273, and the sliding block 274 of the power assembly 27 and the moving paths of the sliding ends 263B of the scissor linkage group 263 are parallel to each other. In this way, the scissor linkage group 263 of the lifting mechanism 26 may drive the display unit 28 disposed on the lifting mechanism 26 to be lifted or lowered relative to the base 24 when being driven by the power assembly 27.

Further, in this embodiment, the portable electronic apparatus 1 may further includes two auxiliary members 30. Each of the first sliding slots 2611 and the sliding block 274 of each of the power assemblies 27 are located at two opposite sides of the each of the auxiliary members 30, and each of the auxiliary members 30 is connected to the sliding block 274 of each of the power assemblies 27. Moreover, the sliding block 274 of each of the power assemblies 27 further includes an engaging portion 2741. The engaging portion 2741 extends towards the scissor linkage group 263, and the engaging portion 2741 may be detachably engaged with the auxiliary member 30.

To be more specific, in this embodiment, the scissor linkage group 263 further includes two pivotal connection members 263. The pivotal connection members 2633 are located at the sliding ends 263B of the second linkage 2632, and the pivotal connection members 2633 are suited to pass through the first sliding slots 2611 of the bottom plate 261 to be connected to the auxiliary members 30. Therefore, the power assembly 27 may be connected to the lifting mechanism 26 through the auxiliary members 30, the engaging portion 2741, and the pivotal connection members 2633 to drive the lifting mechanism 26 to be lifted or lowered.

In addition, in this embodiment, the portable electronic apparatus 1 further includes a control module 32 and a sensing module (not shown). The control module 32 is suited to be electrically connected to the motor 271 of the power assembly 27 to drive the display unit 28 of the second screen 20 to be lifted or lowered through the motor 271 after the second screen 20 is moved out of the first screen 10. The sensing module is suited to be electrically connected to the control module 32, so that the control module 32 may sense whether the second screen 20 is moved out of the first screen 10 through the sensing module. Herein, the control module 32 is exemplified as an electronic device disposed on a flexible circuit board (FPC) as shown in FIG. 6 and FIG. 8. The sensing module is, for example, a track sensor such as an optical (infrared) sensor disposed on the arcuate track 22 of the guiding member 12 to accordingly determine whether the second screen 20 is completely moved out of the first screen 10.

Note that in the foregoing, only the process of driving by lifting mechanism 26 to be lifted or lowered by the motor 271 of the power assembly 27 is described, but in other embodiments, it may be expected that the lifting mechanism 26 of the portable electronic apparatus 1 may be lifted or lowered through manual operation, for example. A method and a form in which the power assembly 27 provides power to the lifting mechanism 26 are not particularly limited in the disclosure.

In view of the foregoing, in the portable electronic apparatus with multiple screens provided by the disclosure, the second screens are movably coupled to the first screen to be received in the first screen or to be moved out of the first screen. Moreover, the second screens may be lifted or lowered through the lifting mechanisms and drive the display units on the lifting mechanisms to be lifted or lowered relative to the base. Accordingly, when the second screens are moved out of the first screen and steps are provided between the display surfaces of the display units and the display surface of the first screen, the display units are adapted to be lifted relative to the base through the lifting mechanisms to compensate the steps. In this way, the portable electronic apparatus may exhibit good operation flexibility and provides an appealing overall appearance, and a user may therefor enjoy a favorable visual effect when operating the portable electronic apparatus.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A portable electronic apparatus with multiple screens, comprising:
   a first screen; and
   a second screen, movably coupled to the first screen along an arcuate path to be received in the first screen or moved out of the first screen, wherein a display surface of the first screen and a display surface of the second screen face a same direction, and the second screen comprises:
      a base;
      at least one lifting mechanism, disposed on the base; and
      a display unit, disposed on the at least one lifting mechanism to be driven by the at least one lifting mechanism to be lifted or lowered relative to the base,
      wherein when the second screen is moved out of the first screen and a step is provided between a display surface of the display unit and the display surface of the first screen, the display unit is adapted to be lifted relative to the base through the at least one lifting mechanism to compensate the step,
      wherein the at least one lifting mechanism comprises:
         a bottom plate, disposed on the base, having a pair of first sliding slots;
         a carrier platform, having a pair of second sliding slots, the display unit disposed on the carrier platform; and
         a scissor linkage group, having a plurality of pivotal connection ends and a plurality of sliding ends, wherein the pivotal connection ends are pivotally connected to the bottom plate and the carrier platform, and the sliding ends individually pivot and are slidably coupled to the first sliding slots and the second sliding slots.

2. The portable electronic apparatus with multiple screens according to claim 1, wherein the scissor linkage group comprises a pair of first linkages and a pair of second linkages pivotally connected to each other at specific locations, each of the first linkages and the second linkages has the pivotal connection end and the sliding end, and the locations are located between the pivotal connection ends and the sliding ends.

3. The portable electronic apparatus with multiple screens according to claim 1, wherein the sliding ends move synchronously in a same direction, pivoting axes of the pivotal connection ends are parallel to pivoting axes of the sliding ends, and moving paths of the sliding ends are parallel to each other, such that the carrier platform is lifted or lowered parallel to the bottom plate.

4. The portable electronic apparatus with multiple screens according to claim 1, further comprising at least one power assembly, connected to the pair of sliding ends, wherein the at least one power assembly comprises:
   a motor, disposed on the base;
   a screw shaft, connected to the motor;
   a guiding shaft, disposed on the base; and a sliding block, screwed to the screw shaft, slidably connected to the guiding shaft, wherein the sliding block is connected to the sliding end, and the motor drives the sliding block through the screw shaft and synchronously drives the sliding ends to move along the first sliding slot and the second sliding slot.

5. The portable electronic apparatus with multiple screens according to claim 4, wherein moving paths of the screw shaft, the guiding shaft, and the sliding block and moving paths of the sliding ends are parallel to each other.

6. The portable electronic apparatus with multiple screens according to claim 4, wherein the scissor linkage group and the at least one power assembly are located at two opposite sides of the first sliding slot, the portable electronic apparatus further comprises at least one auxiliary member connected to the sliding block, and the scissor linkage group further comprises at least one pivotal connection member penetrating through the first sliding slot and is connected to the at least one auxiliary member.

7. The portable electronic apparatus with multiple screens according to claim 6, wherein the sliding block has an engaging portion extending towards the scissor linkage group, and the engaging portion is detachably engaged with the at least one auxiliary member.

8. The portable electronic apparatus with multiple screens according to claim 4, further comprising a control module, electrically connected to the motor to drive the display unit of the second screen to be lifted or lowered through the motor after the second screen is moved out of the first screen.

9. The portable electronic apparatus with multiple screens according to claim 8, further comprising a sensing module, electrically connected to the control module, wherein the control module senses whether the second screen is moved out of the first screen through the sensing module.

10. The portable electronic apparatus with multiple screens according to claim 1, wherein the first screen is a curved screen, and the second screen is a flat screen.

11. The portable electronic apparatus with multiple screens according to claim 1, further comprising at least one guiding member, disposed on the first screen, wherein a side edge of the second screen has an arcuate track, and the at least one guiding member is coupled to the arcuate track.

* * * * *